April 23, 1957 A. L. SCOTT 2,789,332

APPARATUS FOR DRY PRESSING FLOWER POT

Filed Oct. 28, 1952 3 Sheets-Sheet 1

INVENTOR.
ARTHUR L. SCOTT

BY

Herschel C. Omohundro
attorney

III
III
INVENTOR.
ARTHUR L. SCOTT
BY
attorney

APPARATUS FOR DRY PRESSING FLOWER POT

Filed Oct. 28, 1952 3 Sheets-Sheet 3

INVENTOR.
ARTHUR L. SCOTT
BY
Herschel C. Omohundro
attorney

United States Patent Office 2,789,332

Patented Apr. 23, 1957

1

2,789,332

APPARATUS FOR DRY PRESSING FLOWER POT

Arthur L. Scott, Columbus, Ohio, assignor, by mesne assignments, to American Brake Shoe Company, New York, N. Y., a corporation of Delaware Application October 28, 1952, Serial No. 317,231

9 Claims. (Cl. 25—27)

This invention relates to hydraulic apparatus for automatically dry pressing or molding articles from powdered, granulated or otherwise comminuted materials.

An object of this invention is to provide a hydraulically operated apparatus having a mold with sections which are relatively movable to secure a unique pressing action, the sections being separable to permit the removal of formed articles and capable of partial or step by step assembly to provide a cavity which will permit the introduction of the powdered, granulated or otherwise comminuted material and then completely assembled and the parts moved relative to one another to complete the article forming operation.

Another object of the invention is to provide apparatus for dry pressing articles from powdered materials, the apparatus having a mold with a stationary substantially frusto-conical inner section and separately movable side and end sections, the apparatus also having means for moving the side section toward and locating the same adjacent the inner section to form a chamber for receiving the dry powdered material, means also being provided for moving the end section into contact with the side section and then moving these sections simultaneously to effect the formation of an article; following this operation, the sections are again separated to permit the ejection and removal of the article preparatory to starting a new cycle of operation.

A further object is to provide the apparatus, mentioned in the preceding paragraph, with means for feeding the powdered material to the chamber therefor and other means for agitating the frusto-conical inner section of the mold to cause the powdered material to more properly fill the chamber and be oriented therein to facilitate the formation of the article when the parts of the die or mold are moved relative to one another.

A still further object is to provide the mold sections, mentioned in the preceding paragraphs, with a resiliently pressed portion which will facilitate the separation of the side section of the die from the formed article when the parts of the die are moved relative to one another after the article has been formed.

Further objects and advantages of the present invention will be apparent from the following description, reference being had to the accompanying drawings wherein a preferred form of embodiment of the invention is clearly shown.

In the drawings:

Fig. 2 is a similar view with parts of the apparatus in different positions, the parts being shown in the positions they occupy during the mold filling operation;

Fig. 3 is a vertical sectional view taken through the

Figure 4:
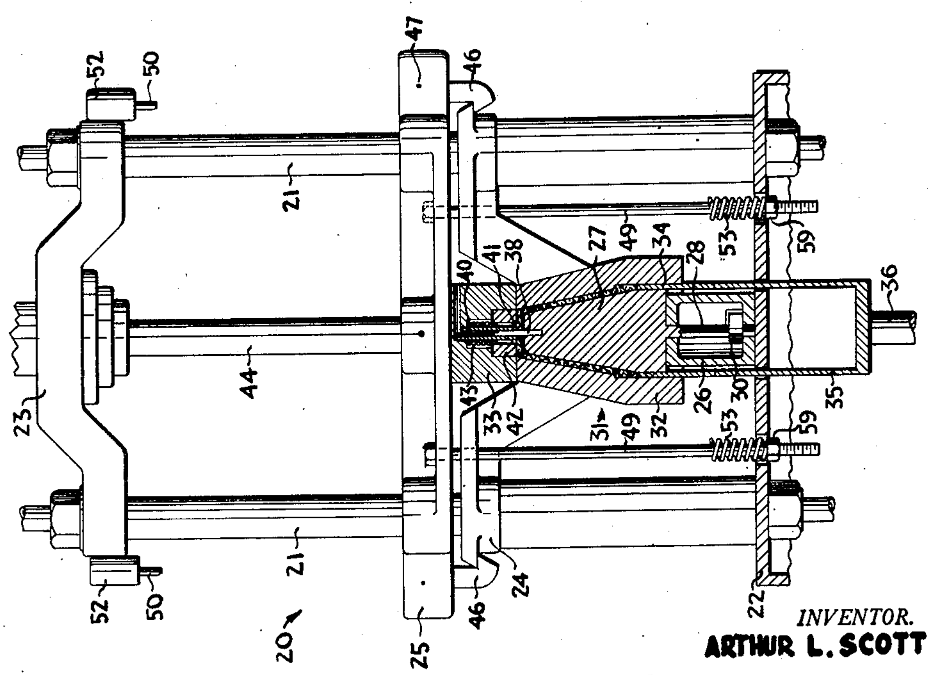
Figures 2, 3:
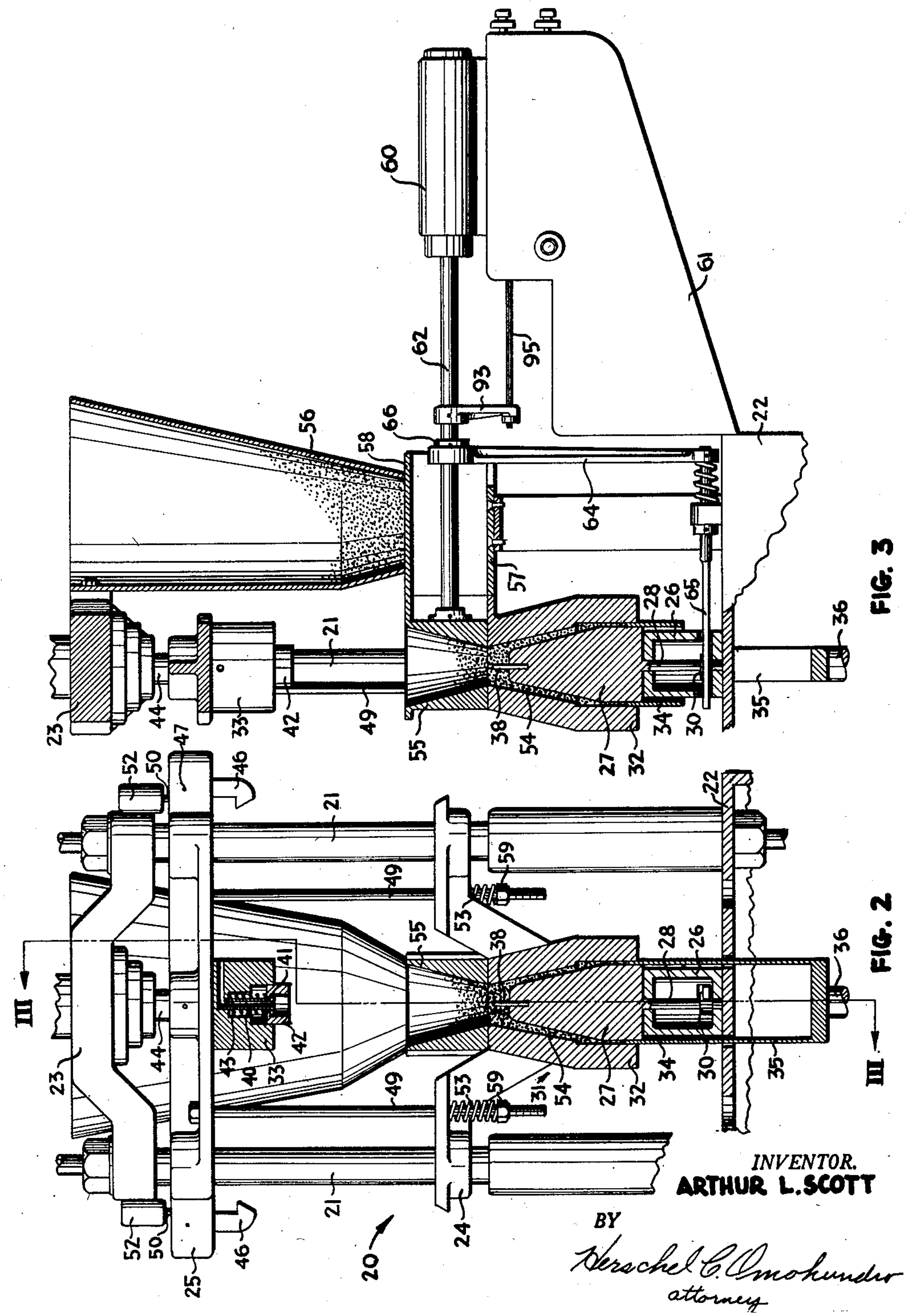
Figure 5:
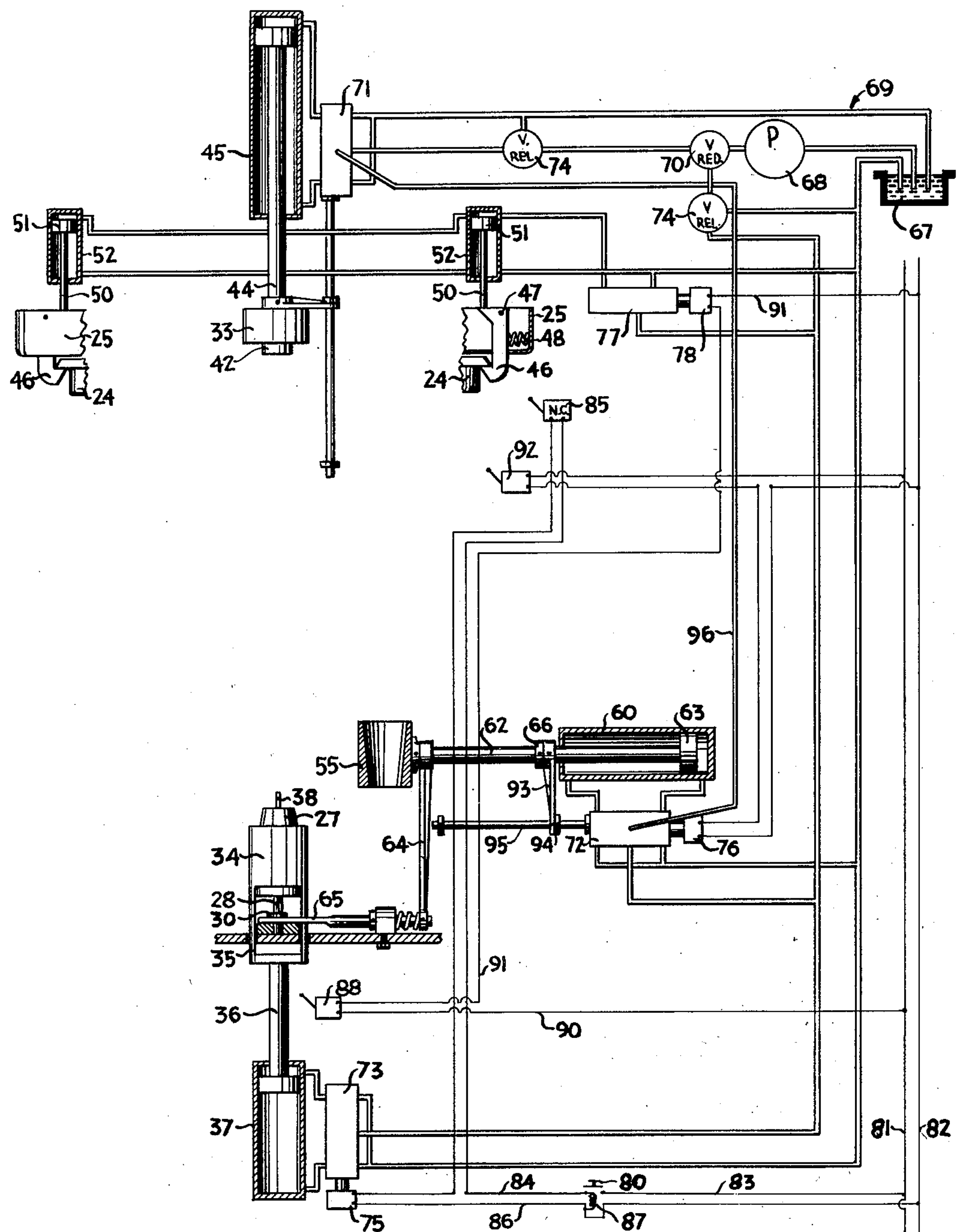

2 apparatus on the plane indicated by the line III—III of Fig. 2;

Fig. 4 is a vertical sectional view with parts shown in elevation, the parts of the apparatus being shown in the positions occupied following the formation of an article; and Fig. 5 is a diagrammatic view of the combined hydraulic and electrical circuits employed in the automatic operation of the apparatus.

Referring more particularly to the drawings, the apparatus is indicated generally by the numeral 20. The form of apparatus selected for illustration is a two-strain rod type of press, the strain rods being indicated by the numeral 21. These strain rods project upwardly from a base member 22 and are connected at their upper ends by a frame member 23. The strain rods provide guides for a pair of cross heads 24 and 25, these crossheads being separately movable along the strain rods. The base member 22 receives and supports a cylindrical stand 26 on which the inner section 27 of a forming or molding die is positioned. This inner section is of substantially frusto-conical shape and is provided with a depending stem 28 on which a pinion 30 is secured. The stem 28 is journaled in the stand 26 to permit the section 27 to be revolved. The inner section 27 of the die or mold is formed for cooperation with another section 31 which includes side and end forming members 32 and 33, respectively. The side section is formed with an opening which is shaped similarly to the inner section 27 but is of greater size than such section so that, when the parts are disposed in adjoining relationship as shown in Figs. 2, 3 and 4, a space will be provided therebetween. This space is closed at its lower end by a tubular member 34 which is disposed for vertical sliding movement around the inner die section and the stand 26, the tubular member being supported by a fork member 35 having spaced tines projecting through openings formed in the base 22. This fork member is carried by a ram 36 which forms a movable part of a knockout cylinder 37, this member being disclosed in the diagrammatic view shown in Fig. 5. The tubular member 34 has the upper edge thereof shaped to transmit a rounded contour to the edge of the formed article.

In this instance, the article selected for illustration is a flower pot or a similar cup-shaped device. It is formed in an inverted position and the tubular member 34 forms the edge at the open top end of the article. The inner section of the die has a pin 38 projecting therefrom to form the opening usually found in the bottom of a flower pot. This pin is adapted to enter an opening provided in a tube 40 projecting downwardly from the end section of the die and having a flange 41 formed thereon to limit the movement of an insert 42 which slides in the section 33 and is urged in an outward or downward direction by a coil spring 43. The purpose of this coil spring and the movement of the member 42 will be set forth in the following description.

As previously mentioned, the sections 32 and 33 are separately movable, being carried by the cross heads 24 and 25; the latter crosshead is secured to the ram 44 of a power cylinder 45 which is supported by the frame member 23. The cross head 24, which carries the side section of the die, is normally suspended from the crosshead 25 by latch members 46 having pivotal connections as at 47 with the cross head 25. These latch members engage the crosshead 24 and hold it in an elevated position, the latch members being urged toward operative positions by coil springs 48. These latch members are arranged to be released by plungers 50 projecting from pistons 51 which are disposed for movement in cylinders 52, these cylinders being secured to the frame member 23. The crosshead 25 carries a plurality of depending rods 49 which project through openings formed in the crosshead 24 and are provided at their lower ends with stopnuts 59 and springs 53. These stopnuts and springs serve to locate the side section of the die when the latter drops, by gravity, after the release of the latches 46. The nuts 59 are so adjusted that the springs will stop the side section in its downward movement in a position to provide a material receiving chamber 54 around the inner die section 27. This chamber has a greater volume than the final forming chamber as will be noted in a comparison of Figs. 2 and 4.

Figure 1:
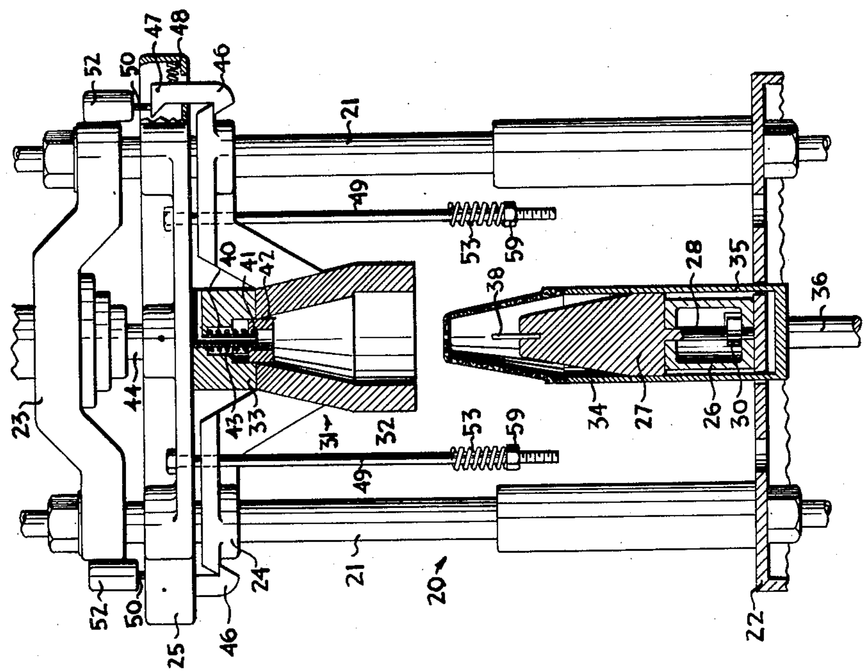
Fig. 1 is a vertical longitudinal sectional view, with parts in side elevation, of an apparatus formed in accordance with the present invention, this view showing the parts of the apparatus following the formation and ejection of an article at the conclusion of a cycle of operation.

The reason for this difference in volume will be obvious since powdered material containing a quantity of air will be introduced into the chamber, as it is shown in Fig. 2, then the parts of the die will be moved to compress this powdered material into a compact article as shown in Figs. 1 and 4. Due to the frusto-conical formation of the inner member of the die and the chamber in the side section thereof, a highly compressive force will be imparted to the powdered material when the die sections are moved from the positions shown in Fig. 2 to that shown in Fig. 4. After the latches 46 have been released and the outer section of the die has moved to the position shown in Fig. 2, a feed box 55 is moved from a position in registration with a material supply hopper 56 to a position in registration with the chamber 54 to fill the same with the article forming material. This feed box is supported for sliding movement on a bracket 57 disposed beneath the hopper 56; it is provided with a rearwardly extending shelf 58 which closes the open end of the hopper when the box 55 is moved to a mold charging position. To effect the movement of the box 55, there is provided a power cylinder 60, this cylinder being supported on a bracket 61 projecting rearwardly from the base member 22. The power cylinder 60 includes a ram 62 which transmits motion from the piston 63 of the power cylinder 60 to the feed box 55. This ram also transmits motion through an arm 64 to a rack 65 which is supported in meshing engagement with the pinion 30. This rack is spring pressed in one direction and is arranged to be moved by the ram 62 during the final stage of movement of the feed box 55 to a charging position.

Any suitable valve mechanism may be provided to control the flow of fluid pressure to the power cylinder 60 although it is proposed to utilize a valve of the type shown in Patent No. 2,546,581, issued March 27, 1951, to Cecil E. Adams. This valve causes the piston of the power cylinder to move through a material charging stroke then, at the termination of this stroke, the piston reciprocates through a small portion of the stroke a desired number of times. During this movement, the powder in the feed box will be agitated and, through the provision of the arm 64 and rack 65, the inner section of the die will be oscillated. The material will thus be fed into the mold and oriented therein so that the mold will be completely charged with the article forming material. After the agitation, the piston is retracted in the power cylinder 60 to move the feed box into position beneath the hopper 56. During this movement, a collar 66 on the ram 62 will move away from the arm 64. This collar serves to effect the movement of the rack 65 during the final stage of movement only of the feed box.

Following the charging of the chamber 54 in the mold, the power cylinder 45 is operated to move the crosshead 25 and end section 33 of the die toward the inner and side sections. As the crosshead 25 moves in a downward direction, the springs 53 move away from the crosshead 24 permitting the side section of the mold to rest on the material in the chamber 54. After the ram 44 has moved a sufficient distance, the end section 33 of the die will engage the side section and these sections will move in unison to compress the material in the chamber 54. During this movement or immediately prior thereto, the tubular member 34 moves in an upward direction to assist in the formation of the article. This movement of the member 34 also reduces the volume of the die and serves to compress the material which forms the upper edge of the finished article. When the power cylinder 45 has exerted a predetermined tonnage and the article is completely formed, the piston in the power cylinder 45 will then move in a reverse or upward direction, moving with it the crosshead 25 and the crosshead 24 which the latches 46 have again engaged. As the crossheads move in an upward direction, the side and end sections of the mold will move away from the inner section. During the initial movement of the side and end sections, spring 43 will expand and hold insert 42 in engagement with the end of the formed article. This action of the insert and spring will serve to separate the formed article from the side walls of the side section of the die; after the initial movement, the flange on the tube 40 will move the insert 42 away from the formed article. This article is then stripped from the inner section 27 by the movement of the tubular member 34 in an upward direction by the power cylinder 37. The finished article will then be supported in the position shown in Fig. 1 and may be removed by hand or other suitable mechanism for further processing.

Fig. 5 shows, diagrammatically, a hydraulic system and electrical circuit with which the apparatus shown in the other figures of the drawing may be automatically operated. The hydraulic system includes a source of pressure 69 having a reservoir 67, a motor-driven pump 68, and fluid lines leading from the reservoir to and from the pump. At the discharge side of the pump 68, there is provided a reducing valve 70 which functions to reduce the pressure for portions of the hydraulic system which do not require the high forming pressure necessary for the power cylinder 45. The system includes automatic control valves 71 and 72, the former governing the operation of the power cylinder 45 and the latter governing the operation of the power cylinder 60. A third automatic valve 73 is provided to govern the operation of the power cylinder 37 which moves the knockout ram 36. It should be obvious that, if desired or otherwise found necessary, the power cylinders 37 and 60 might be operated by the same pressure employed in the operation of the power cylinder 45. One or more relief valves 74 are provided to regulate the pressure in the various sections of the hydraulic system. The valve 74 is used to determine the tonnage exerted by the power cylinder 45 in the material pressing operation. Valves 71, 72 and 73 may be of the type shown in the previously mentioned Adams patent or they may be modified as desired. In the present instance, valves 72 and 73 are modified by the inclusion of solenoids 75 and 76 which initiate the automatic operation of the valves 72 and 73. Another control valve 77 is provided, this valve serving to govern the operation of the cylinders 52 which release the latches 46. While these cylinders are illustrated as being hydraulically operated, it is within the concept of the invention to utilize air cylinders to actuate the latches if desired. Control valve 77 is also solenoid operated, the solenoid being designated by the numeral 78.

The cycle of operation of the apparatus is as follows assuming that the parts of the apparatus are disposed in the positions shown in Fig. 1 wherein the knockout ram 36 has elevated the tubular member 34 to hold a formed article in position to be removed: Following the removal of the formed article, the operator closes a starting switch 80 which completes the circuit for solenoid 75. This circuit includes supply lines 81 and 82, lead 83 which extends from one of the supply lines to switch 80, lead 84 extending from the switch 80 through a normally closed switch 85 to the solenoid 75, lead 86 extending from this solenoid back to the other supply line. When the switch 80 is closed, current is supplied to a holding coil 87 which serves to maintain switch 80 in a closed position. When solenoid 75 is energized, valve 73 is disposed in position to effect the retraction of the ram 36.

Since switch 80 remains closed, valve 73 will be held in this position with the ram 36 and the tubular member 34 carried thereby in retracted positions. As the ram 36 moves in its retractive stroke, it will engage and operate a limit switch 88, the operating element of which is disposed in the path of movement of the member 35 carried by the ram. When switch 88 is closed, current will be supplied through lines 90 and 91 to the solenoid 78 energizing this solenoid and opening valve 77. The closing of switch 88 is only momentary, however, sufficient time elapsing during the actuation of the valve 77 to permit the power cylinders to effect the release of the latches 46.

When these latches are released, as previously pointed out, the crosshead 24 will descend, by gravity, to position the side section of the mold in adjoining relationship to the inner section and the member 34. When the crosshead 24 reaches this position, it will actuate another limit switch 92 to energize the solenoid 76 and initiate the automatic operation of the valve 72 and power cylinder 60 controlled thereby. When solenoid 76 is energized, a movable element of valve 72 will be disposed in position to cause fluid to be directed from the power source to the power cylinder 60 to cause piston 63 to project ram 62 from the power cylinder. This ram moves the feed box 55, in the manner set forth previously, from beneath the hopper 56 to a position over the mold or die. After the feed box has been projected to the proper position, the valve 72 causes the piston 63 to vibrate to agitate the feed box and to oscillate the die. Following this agitation, the ram 62 is returned to its retracted position. After the termination of the retraction of ram 62, an arm 93 carried thereby engages a collar 94 on valve stem 95 and moves a movable element of the valve to a position to direct fluid under pressure through a line 96 to the valve 71, this valve having a pressure responsive element therein which, when fluid is supplied through the line 96, will initiate the operation of the power cylinder 45. Following the introduction of the fluid under pressure to the valve 71 through line 96, this valve 71 will effect a cycle of operation of the power cylinder 45. This cycle includes the advancement of ram 44 and the crosshead 25 and die section 33 to a material pressing position. When the pressure determined by the relief valve 74 has been exerted on the materials in the die, valve 71 will reverse the movement of the ram 44 causing it to move crossheads 24 and 25 and die parts carried thereby to a retracted position.

It will be noted from Fig. 5 that the normally closed limit switch 85 has its actuating element disposed in the path of movement of the crosshead 25, therefore, when crosshead 25 moves in a downward direction, it will open switch 85 and interrupt the flow of current to the solenoid 75. When this solenoid is de-energized, valve 73 will then function to complete the cycle of operation of the power cylinder 37. In calculating the size of this power cylinder or the fluid pressure used for operating it, the force to be exerted by the ram 36 will bear such a relation to the force exerted by ram 44 that part 34 of the die will serve to assist in the formation of the article but will be held against elevation until ram 44 moves in its retractive stroke. Following the completion of the pressing operation, ram 44 will retract moving the side and end sections of the die away from the inner section and the formed article. The flow of fluid pressure to the power cylinder 45 will be such that the die sections will move at a faster rate than the finished article is ejected by the ram 36. This ram will come to rest in the position shown in Fig. 1 where it will hold the finished article in position for removal. The apparatus is then in condition for the next succeeding cycle of operation. It should be obvious that, if desired, the starting switch 80 could be so located that it would be operated by the ram 44 or parts carried thereby so that the succeeding cycle of operation would be initiated by the final stage of the preceding cycle. It should also be obvious that the finished articles must be removed from the member 34 between cycles of operation of the apparatus.

While one embodiment of the invention has been illustrated and described, it should be obvious that the apparatus illustrated could be modified in many ways without departing from the spirit and scope of the invention as set forth in the following claims:

I claim:

1. Apparatus for dry pressing pot-like bodies comprising a longitudinally fixed inner die section; an outer die section having separately longitudinally movable side and end portions; means for disposing the side portion of said outer die section in a primary cavity-forming position relative to said inner die section to receive material to form an article; means for supplying material to the cavity formed by said die portions; means for rotating one of said die sections while said material is in said cavity to distribute said material therein; means for longitudinally moving said end and side portions relative to said inner die section to compress the distributed material into a finished article; means for separating said outer die section from said inner die section and the finished article; and means for ejecting the finished article from said inner die section.

2. Apparatus for dry pressing pot-like bodies comprising a longitudinally fixed frusto-conical inner die section; an outer die section having separately longitudinally movable side and end portions, the former having an internal wall inclined similarly to the wall of said inner die section; means for disposing the side portion of said outer die section in a predetermined cavity-forming position spaced relative to said inner die section; means for supplying body forming material to the space between said inner and side die sections; means for rotating one of said die sections while said material is in said cavity to distribute said materal therein; means for longitudinally moving said end portion into engagement with said side portion and said portions in unison relative to said inner die section to compress said distributed body-forming material into a finished article; means for separating said outer die section from said inner die section and the finished article; and means for stripping the finished article from said inner die section.

3. Apparatus for dry pressing pot-like bodies comprising a longitudinally fixed frusto-conical inner die section; an outer die section supported for longitudinal movement toward and away from said inner die section, said outer die section having separately longitudinally movable side and end portions, the former having an inner wall inclined similarly to the wall of said inner section; means for disposing the side portion of said outer die section in a predetermined cavity-forming position spaced relative to said inner section; means for feeding body-forming material into the space between said side and inner die portions; means for rotatively oscillating said inner die portion during a part of said feeding operation; means for moving the outer die section relative to the inner die section to compress the body-forming material into a finished body; means for separating the outer die section from the inner die section and said finished article; and means for removing the finished article from said inner die section.

4. Apparatus for dry pressing pot-like bodies comprising a longitudinally fixed inner die section; an outer die section having separately longitudinally movable side and end portions; means for disposing the side portion of said outer die section in a primary material-receiving cavity-forming position relative to said inner die section; means for supplying material to the cavity formed by said die portions; means for rotating one of said die sections while said material is in said cavity to distribute said material therein; means for longitudinally moving said end and side portions relative to said inner die section to compress the distributed material into a finished article;

means for simultaneously holding the finished article on the inner die section and moving the outer die section away therefrom; and means for removing the finished article from said inner die section.

5. Apparatus for dry pressing pot-like bodies comprising a longitudinally fixed inner die section; an outer die section having separately longitudinally movable side and end portions; means for disposing the side portion of said outer die section in a primary material-receiving cavity-forming position relative to said inner die section; means for supplying material to said die portions; means for rotating one of said die sections while said material is in said cavity to distribute said material therein; means for longitudinally moving said end and side portions relative to said inner die section to compress the distributed material into a finished article; means for longitudinally moving said outer die section away from said inner die section; means for holding the finished article on the inner die section during the initial movement of said outer die section away from said inner die section; and means for removing the finished article from said inner die section.

6. Apparatus for dry pressing pot-like bodies comprising a longitudinally fixed inner die section; a combined rim-forming and ejector member disposed for longitudinal movement around said inner die section; fluid motor means for moving said rim-forming and ejector member; an outer die section having side and end portions guided for separate longitudinal movement toward and away from said inner die section, said side and end portions being normally retracted from said inner die portion; means for disposing said side portion in a predetermined cavity-forming position spaced relative to said inner die section and said rim-forming and ejector member; means for introducing body-forming material into the space between said inner and side die sections; fluid motor means for longitudinally moving the outer die section relative to the inner die section to compress the body-forming material into a finished body, said motor means serving to move such outer die section away from said inner die section following the formation of a finished body; and means for holding the finished article on the inner die section during the initial movement of said outer die section away from said inner die section, the motor for said rim-forming and ejector member serving to remove the finished article from said inner die section following the movement of said outer die section away therefrom.

7. Apparatus for dry pressing pot-like bodies comprising a frame; a longitudinally fixed inner die section supported for rotary movement on said frame; an outer die section guided on said frame for longitudinal movement relative to said inner die section, said outer die section having independently movable side and end portions; means for disposing the side portion of said outer die section in a primary cavity-forming position relative to said inner die to receive the body-forming material; means for introducing body-forming material into the cavity formed by the inner and side die sections; means for imparting alternate rotary motions to said inner die section during a portion of the introduction of material into said cavity; means for disposing the end portion of said outer die section in position relative to said side portion and simultaneously moving said portions relative to said inner die portion to form an article; means for moving said side portion of the outer die relative to the formed article while the end portion temporarily holds the same on said inner die section, said side and end portions simultaneously moving away from the formed article following initial movement by said side portion; and means for moving the formed article longitudinally relative to said inner die section to strip it therefrom.

8. Apparatus for dry pressing pot-like bodies comprising a frame; a longitudinally fixed inner die section supported for rotary movement on said frame; an outer die section guided on said frame for longitudinal movement relative to said inner die section, said outer die section having independently movable side and end portions; means for disposing the side portion of said outer die section in a primary cavity-forming position relative to said inner die to receive the body-forming material; means for introducing body-forming material into the cavity formed by the inner and side die sections; means for imparting alternate rotary motions to said inner die section during a portion of the introduction of material into said cavity; means for disposing the end portion of said outer die section in position relative to said side portion and simultaneously moving said portions relative to said inner die portion to form an article; means for moving the side and end portions of the outer die section away from the formed article; means between the last-mentioned means and said end portion to yieldably retain the end portion in engagement with the formed article during the initial movement of said side portion away from the formed article; and means for moving the formed article relative to said inner die section to strip it therefrom.

9. Apparatus for pressing bodies including die sections adapted to cooperate to form a mold cavity; means for disposing said die sections to form a cavity of larger volumetric capacity than the body to be molded therein; means for supplying material to said mold cavity; means for rotatively moving one of said die sections with respect to another to distribute said material in said mold cavity, and means for moving at least one of said die sections with respect to another to press said material in said die.

References Cited in the file of this patent

UNITED STATES PATENTS

| | | |
|---|---|---|
| 546,297 | Breitschwerth | Sept. 17, 1895 |
| 1,375,950 | Bewley | Apr. 26, 1921 |
| 1,675,550 | Handley | July 3, 1928 |
| 1,698,603 | Moore | Jan. 8, 1929 |
| 1,770,219 | Shakespeare | July 8, 1930 |
| 1,794,556 | Skidmore | Mar. 3, 1931 |